(12) United States Patent
Hu

(10) Patent No.: US 8,823,650 B2
(45) Date of Patent: Sep. 2, 2014

(54) COMPUTING DEVICE AND METHOD FOR ADJUSTING DISPLAY PARAMETERS OF MONITOR

(75) Inventor: Ming-Xiang Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 186 days.

(21) Appl. No.: 13/300,614

(22) Filed: Nov. 20, 2011

(65) Prior Publication Data

US 2012/0154280 A1 Jun. 21, 2012

(30) Foreign Application Priority Data

Dec. 20, 2010 (CN) .......................... 2010 1 0596707

(51) Int. Cl.
- *G06F 3/033* (2013.01)
- *G09G 5/00* (2006.01)
- *G06F 17/00* (2006.01)

(52) U.S. Cl.
USPC .............................. 345/163; 345/156; 463/37

(58) Field of Classification Search
CPC ........................... G06F 3/0383; G06F 3/03543
USPC .............. 345/163, 156; 463/37–38; 715/828, 715/829, 844
See application file for complete search history.

(56) References Cited

U.S. PATENT DOCUMENTS

| | | | | |
|---|---|---|---|---|
| 7,559,035 B2* | 7/2009 | Deel et al. | ...... | 715/810 |
| 7,751,650 B2* | 7/2010 | Tada et al. | ...... | 382/285 |
| 2006/0001657 A1* | 1/2006 | Monney et al. | ...... | 345/184 |
| 2010/0052847 A1* | 3/2010 | Mortensen | ...... | 340/5.53 |
| 2010/0245249 A1* | 9/2010 | Ng | ...... | 345/166 |
| 2011/0001703 A1* | 1/2011 | Shaw et al. | ...... | 345/163 |

FOREIGN PATENT DOCUMENTS

EP 697689 B1 * 9/2001

* cited by examiner

*Primary Examiner* — Lun-Yi Lao
*Assistant Examiner* — Ibrahim Khan
(74) *Attorney, Agent, or Firm* — Novak Druce Connolly Bove + Quigg LLP

(57) ABSTRACT

In a method for adjusting display parameters of a monitor of a computing device, the computing device electronically or wirelessly connects to a mouse that includes a primary button, a secondary button, a scroll wheel, a function button and a microcontroller. The microcontroller detects whether the function button is pressed, clicking of the primary button or the secondary button, motions of the scroll wheel, and motions of the mouse. An adjustment mode of the monitor is predefined. The monitor is controlled into the adjustment mode by pressing the function button. The display parameters can be adjusted with the primary button, the secondary button or the scroll wheel when the monitor is in the adjustment mode.

19 Claims, 4 Drawing Sheets

COMPUTING DEVICE AND METHOD FOR ADJUSTING DISPLAY PARAMETERS OF MONITOR

BACKGROUND

1. Technical Field

Embodiments of the present disclosure relate generally to monitor adjustment, and more particularly, to a computing device and a method for adjusting display parameters of a monitor using a mouse of the computing device.

2. Description of Related Art

Typically, users adjust display parameters of a monitor of a computing device when display of the monitor is not satisfactory. A user can adjust the display parameters of the monitor using buttons or knobs, which are positioned on the monitor. However, this method is inconvenient if the monitor is far away from the user. What is needed, therefore, is a method for adjusting the display parameters of the monitor to overcome the limitations described.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
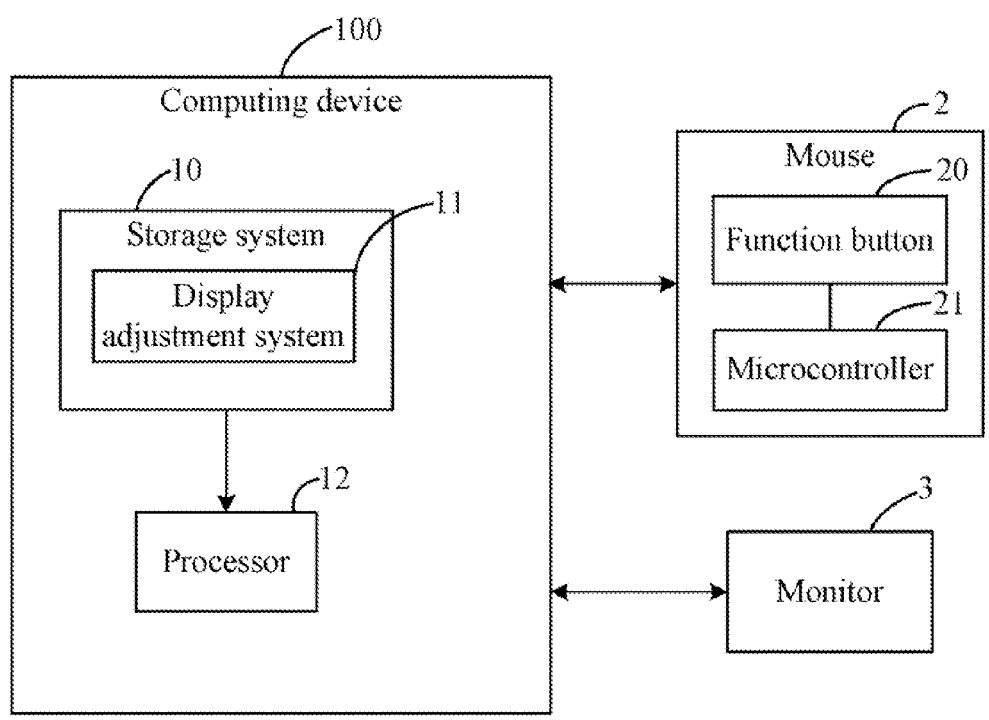
FIG. 1 is a block diagram of one embodiment of a computing device including a display adjustment system and a mouse that electronically or wirelessly connects to the computing device.

FIG. 1 is a block diagram of one embodiment of a computing device 100 including a display adjustment system 11 and a mouse 2 that electronically or wirelessly connects to the computing device 100. In the embodiment, the display adjustment system 11 is configured to adjust display parameters of a monitor 3 of the computing device 100 using the mouse 2. The monitor 3 electronically connects to the computer device 100. The display parameters may include display resolution, contrast ratio, display brightness, and display position. Depending on the embodiment, the computing device 100 further includes a storage system 10 and at least one processor 12. It should be apparent that FIG. 1 is just one example of the computing device 100 that can be included with more or fewer components than shown in other embodiments, or a different configuration of the various components.

The display adjustment system 11 may be in the form of one or more programs that stored in the storage system 10 and executed by the at least one processor 12. In one embodiment, the storage system 10 may be random access memory (RAM) for temporary storage of information, and/or a read only memory (ROM) for permanent storage of information. In other embodiments, the storage system 10 may also be an external storage device, such as a hard disk, a storage card, or a data storage medium. The at least one processor 12 executes computerized operations of the computing device 100 and other applications, to provide functions of the computing device 100.

In the embodiment, the mouse 2 includes a primary button, a secondary button, and a scroll wheel. By default, the primary button is positioned on the left-hand side of the mouse 2, and the secondary button is positioned on the right-hand side of the mouse 2. In the embodiment, the mouse 2 further includes a function button 20 and a microcontroller 21. The function button 20 is positioned on a user-friendly location of the mouse 2, such as a location on the mouse 2 where a user's thumb rests when the mouse 2 is operated.

Figure 2:
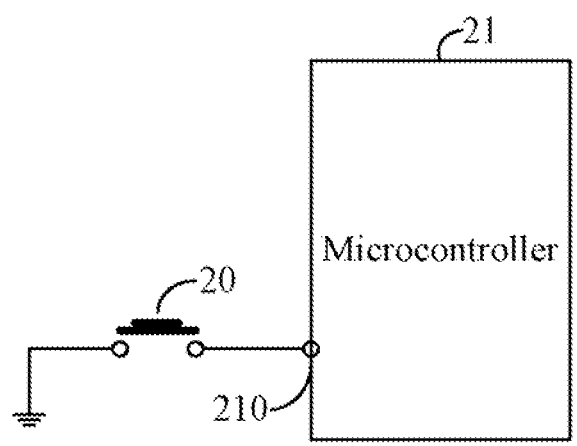
FIG. 2 is a schematic diagram of one embodiment of a circuit of a function button and a microcontroller in the mouse of FIG. 1.

FIG. 2 is a schematic diagram of one embodiment of a circuit of the function button 20 and the microcontroller 21 in the mouse 2 of FIG. 1. The microcontroller 21 includes an I/O port 210. The I/O port 210 is grounded when the function button 20 is pressed, and the voltage of the I/O port 210 is at a low level, such as zero volts. The voltage of the I/O port 210 is set as a high level, such as two volts, by internal circuits in the microcontroller 21 when the function button 20 is released. The microcontroller 21 can continually detect the voltage of the I/O port 210 to determine whether the function button 20 is pressed or released.

The microcontroller 21 further continually detects clicking of the primary button or the secondary button, motions of the scroll wheel, and two-dimensional motions of the mouse 2. The microcontroller 21 sends operation information of the mouse 2 to the host 1. The operation information may include whether the function button 20 is pressed or released, clicking of the primary button or the secondary button, the motions of the scroll wheel, and the motions of the mouse 2. The adjustment system 11 acquires the operation information from the microcontroller 21, and adjusts the display parameters of the monitor 3 according to the operation information.

The display adjustment system 11 is operable to predetermine an adjustment mode of the monitor 3. In the adjustment mode, each operation to the mouse 2, including clicking of the primary button or the secondary button, the motions of the scroll wheel, or the motions of the mouse 2, triggers an adjustment for one of the display parameters of the monitor 3. For example, clicking the primary button once triggers selecting an object that displays on the monitor 3 when the monitor 3 is not in the adjustment mode. However, clicking the primary button once may decrease the contrast ratio of the monitor 3 when the monitor 3 is in the adjustment mode. In the embodiment, the users can control the monitor 3 into the adjustment mode by pressing the function button 20. The monitor 3 displays one of the corresponding display parameters adjusted in the adjustment mode, such as the contrast ratio is decreased from fifteen to fourteen, for observation of the users.

In one embodiment, a horizontal display position of the monitor 3 can be adjusted via left-right motions of the mouse 2, and a vertical display position of the monitor 3 can be adjusted via forward-backward motions of the mouse 2 when the monitor 3 is in the adjustment mode.

In other embodiment, one of the display parameters can be adjusted with the primary button, the secondary button or the scroll wheel after each time the function button 20 is pressed when the monitor 3 is in the adjustment mode. For example, the contrast ratio can be adjusted by clicking the primary button and the secondary button after the function button 20 is pressed at the first time. Clicking the primary button may increase the contrast ratio, and clicking the secondary button may decrease the contrast ratio. The display brightness can be adjusted after the function button 20 is pressed for the second time.

Figure 3:
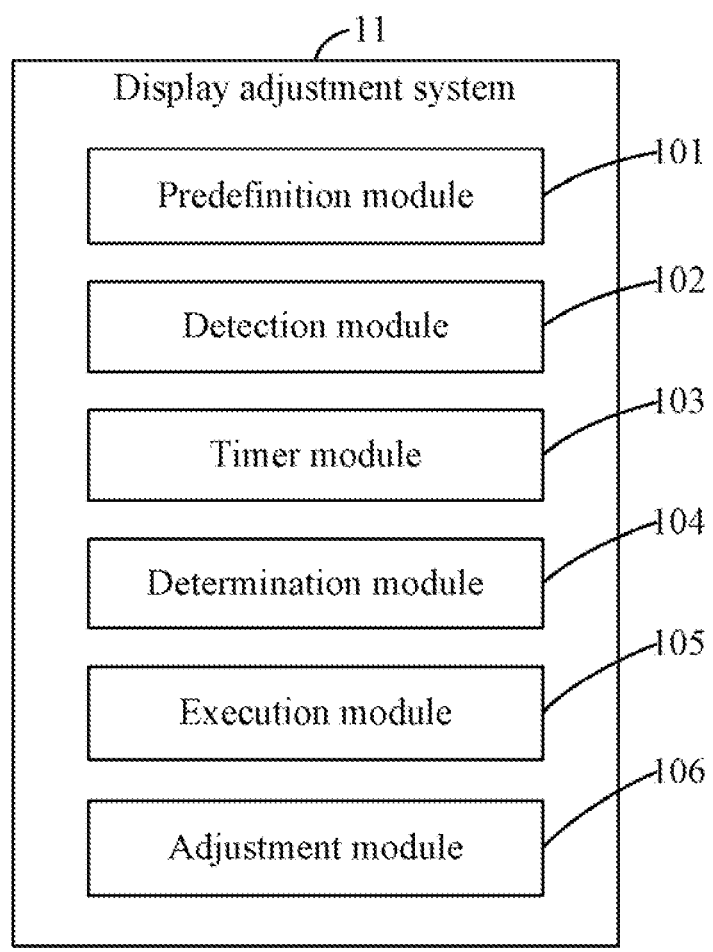
FIG. 3 is a block diagram of one embodiment of functional modules of the display adjustment system included in the computing device of FIG. 1.

FIG. 3 is a block diagram of one embodiment of functional modules of the display adjustment system 11 included in the computing device 100 of FIG. 1. The display adjustment system 11 may include a plurality of functional modules each comprising one or more programs or computerized codes that can be accessed and executed by the at least one processor 12. The display adjustment system 11 may include a predefinition module 101, a detection module 102, a timer module 103, a determination module 104, an execution module 105, and an adjustment module 106. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The predefinition module 101 is operable to arrange the display parameters of the monitor 3 in a sequence, predefine a predetermined time, a number "M" of the display parameters of the monitor 3 and a count value "N", and assign an initial value zero for the count value "N". The sequence, the predetermined time, the number "M", and the count value "N" are stored in the storage system 10.

The predefinition module 101 is further operable to predetermine the adjustment mode of the monitor 3. In the adjustment mode, each operation to the mouse 2 triggers an adjustment for one of the display parameters.

The detection module 102 is operable to continually acquire the operation information from the microcontroller 21 of the mouse 2, and detect whether the function button 20 is pressed according to the operation information.

The timer module 103 is operable to calculate a time of the function button 20 when the function button 20 is pressed, and continually determine whether the calculated time is more than the predetermined time.

The detection module 102 is further operable to detect whether the function button 20 is released according to the operation information when the calculated time is not more than the predetermined time.

The determination module 104 is operable to read the count value "N" from the storage system 10, and determine whether the count value "N" is equal to zero when the function button 20 is released.

The determination module 104 is further operable to read the number "M" from the storage system 10, and determine whether the count value "N" is equal to the number "M" when the count value "N" is not equal to zero.

The execution module 105 is operable to control the monitor 3 into the adjustment mode when the count value "N" is equal to zero.

The adjustment module 106 is operable to increase the count value "N" by one in the storage system 10, and adjust the Nth display parameter of the display parameters in the sequence according to the operation information in the adjustment mode of the monitor 3 when the count value "N" is not equal to the number "M". The operation information includes clicking of the primary button or the secondary button, the motions of the scroll wheel, and the motions of the mouse 2.

The execution module 105 is further operable to control the monitor 3 into the adjustment mode when the calculated time is more than the predetermined time.

The adjustment module 106 is further operable to adjust display parameters according to the operation information in the adjustment mode of the monitor 3 when the calculated time is more than the predetermined time. For example, the horizontal display position of the monitor 3 can be adjusted via left-right motions of the mouse 2, and the vertical display position of the monitor 3 can be adjusted via forward-backward motions of the mouse 2.

The detection module 102 is further operable to detect whether the function button 20 is released according to the operation information when the calculated time is more than the predetermined time.

The adjustment module 106 is further operable to update the count value "N" as zero in the storage system 10, and control the monitor 3 to exit the adjustment mode when the count value "N" is equal to the number "M", or the function button 20 is released when the calculated time is more than the predetermined time.

Figure 4:
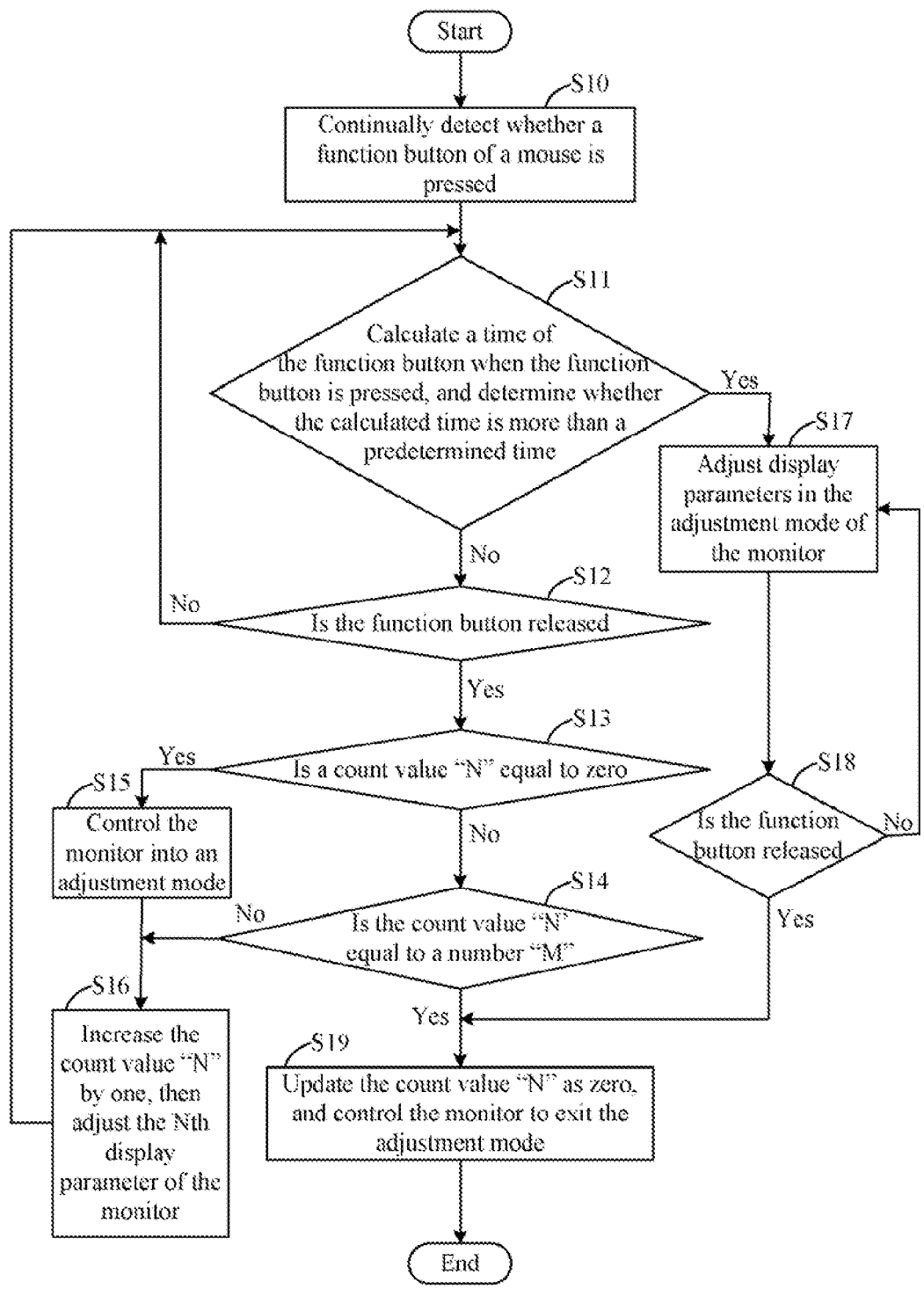
FIG. 4 is a flowchart of one embodiment of a method for adjusting display parameters of a monitor using the mouse of FIG. 1.

FIG. 4 is a flowchart of one embodiment of a method for adjusting display parameters of the monitor 3 using the mouse 2 of FIG. 1. Depending on the embodiment, additional blocks may be added, others removed, and the ordering of the blocks may be changed.

Before block S10, the predefinition module 101 arranges the display parameters of the monitor 3 in a sequence, predefines a predetermined time, a number "M" of the display parameters of the monitor 3 and a count value "N", assigns an initial value zero for the count value "N", and stores the sequence, the predetermined time, the number "M", and the count value "N" in the storage system 10. The predefinition module 101 further predetermines the adjustment mode of the monitor 3. In the adjustment mode, each operation to the mouse 2 triggers an adjustment for one of the display parameters.

In block S10, the detection module 102 continually acquires operation information from the microcontroller 21 of the mouse 2, and detects whether the function button 20 is pressed according to the operation information. The operation information may include whether the function button 20 is pressed or released, clicking of the primary button or the secondary button, the motions of the scroll wheel, and the motions of the mouse 2.

In block S11, the timer module 103 calculates a time of the function button 20 when the function button 20 is pressed, and continually determines whether the calculated time is more than the predetermined time. If the calculated time is not more than the predetermination time, block S12 is implemented. If the calculated time is more than the predetermination time, block S17 is implemented.

In block S12, the detection module 102 detects whether the function button 20 is released according to the operation information. If the function button 20 is released, block S13 is implemented. If the function button 20 is not released, the flow may return to block S11.

In block S13, the determination module 104 reads the count value "N" from the storage system 10, and determines whether the count value "N" is equal to zero. If the count value "N" is not equal to zero, block S14 is implemented. If the count value "N" is equal to zero, block S15 is implemented.

In block S14, the determination module 104 reads the number "M" from the storage system 10, and determines whether the count value "N' is equal to the number "M". If the count value "N" is not equal to the number "M", block S16 is implemented. If the count value "N" is equal to the number "M", block S19 is implemented.

In block S15, the execution module 105 controls the monitor 3 into the adjustment mode, and block S16 is implemented.

In block S16, the adjustment module 106 increases the count value "N" by one in the storage system 10, then adjusts the Nth display parameter of the display parameters in the sequence according to the operation information in the adjustment mode of the monitor 3, and the flow may return to block S11.

In block S17, the execution module 105 controls the monitor 3 into the adjustment mode, and the adjustment module 106 adjusts display parameters according to the operation information in the adjustment mode of the monitor 3.

In block S18, the detection module 102 detects whether the function button 20 is released according to the operation information. If the function button 20 is released, block S19 is implemented. If the function button 20 is not released, the flow may return to block S17.

In block S19, the adjustment module 106 updates the count value "N" as zero in the storage system 10, and controls the monitor 3 to exit the adjustment mode.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
a storage system;
at least one processor;
a mouse that electronically or wirelessly connects to the computing device, the mouse comprising a function button and a microcontroller detecting whether the function button is pressed or released;
a monitor that electronically connects to the computing device, and the monitor comprising a plurality of display parameters; and
one or more programs stored in the storage system and executed by the at least one processor, the one or more programs comprising:
a predefinition module operable to arrange the display parameters of the monitor in a sequence, predefine a predetermined time, a number of the display parameters of the monitor, a count value and an adjustment mode of the monitor, and assign an initial value zero for the count value;
a detection module operable to continually acquire operation information from the microcontroller, and detect whether the function button is pressed according to the operation information;
a timer module operable to calculate a time of the function button when the function button is pressed, and determine whether the calculated time is more than the predetermined time;
the detection module further operable to detect whether the function button is released according to the operation information when the calculated time is not more than the predetermined time;
a determination module operable to determine whether the count value is equal to zero when the function button is released, and determine whether the count value is equal to the number when the count value is not equal to zero;
an execution module operable to control the monitor into the adjustment mode when the count value is equal to zero;

an adjustment module operable to increase the count value by one and adjust one of the display parameter corresponding to the count value in the sequence according to the operation information when the count value is not equal to the number, or adjust the display parameters according to the operation information in the adjustment mode of the monitor when the calculated time is more than the predetermined time, wherein the adjustment module increases a contrast ratio of the monitor by clicking of a primary button of the mouse and decrease the contrast ratio by clicking of a secondary button of the mouse, adjusts a display brightness of the monitor after the function button is pressed for the second time, adjusts a horizontal display position of the monitor via left-right motions of the mouse, and adjusts a vertical display position of the monitor via forward-backward motions of the mouse.

2. The computing device of claim 1, wherein the microcontroller comprises an I/O port.

3. The computing device of claim 2, wherein the voltage of the I/O port is set as a low level by the microcontroller when the function button is pressed, and the voltage of the I/O port is set as a high level by the microcontroller when the function button is released.

4. The computing device of claim 3, wherein the microcontroller detects whether the function button is pressed or released by detecting the voltage of the I/O port.

5. The computing device of claim 1, wherein the operation information comprises whether the function button is pressed or released, clicking of the primary button or the secondary button of the mouse, motions of a scroll wheel of the mouse, and motions of the mouse.

6. The computing device of claim 5, wherein the adjustment module adjusts the display parameters according to the clicking of the primary button or the secondary button, the motions of the scroll wheel, and the motions of the mouse of the operation information.

7. The computing device of claim 1, wherein the detection module is further operable to detect whether the function button is released according to the operation information when the calculated time is more than the predetermined time.

8. The computing device of claim 1, wherein the adjustment module is further operable to update the count value as zero, and control the monitor to exit the adjustment mode when the count value is equal to the number, or the function button is released when the calculated time is more than the predetermined time.

9. The computing device of claim 1, wherein the execution module is further operable to control the monitor into the adjustment mode when the calculated time is more than the predetermined time.

10. A method for adjusting display parameters of a monitor of a computing device, the computing device electronically or wirelessly connecting to a mouse that comprises a function button and a microcontroller, the method comprising:
(a) arranging the display parameters of the monitor in a sequence, predefining a predetermined time, a number of the display parameters of the monitor, a count value and an adjustment mode of the monitor;
(b) assigning an initial value zero for the count value;
(c) continually acquiring operation information from the microcontroller, and detecting whether the function button is pressed according to the operation information;
(d) calculating a time of the function button when the function button is pressed, and determining whether the calculated time is more than the predetermined time;

(e) detecting whether the function button is released according to the operation information when the calculated time is not more than the predetermined time;
(f) determining whether the count value is equal to zero when the function button is released;
(g) determining whether the count value is equal to the number when the count value is not equal to zero;
(h) controlling the monitor into the adjustment mode when the count value is equal to zero;
(i) increasing the count value by one, and adjusting one of the display parameter corresponding to the count value in the sequence according to the operation information when the count value is not equal to the number; or
(j) adjusting the display parameters according to the operation information in the adjustment mode of the monitor when the calculated time is more than the predetermined time, increasing a contrast ratio of the monitor by clicking of a primary button of the mouse and decreasing the contrast ratio by clicking of a secondary button of the mouse, adjusting a display brightness of the monitor after the function button is pressed for the second time, adjusting a horizontal display position of the monitor via left-right motions of the mouse, and adjusting a vertical display position of the monitor via forward-backward motions of the mouse.

11. The method of claim 10, further comprising:
detecting whether the function button is released according to the operation information when the calculated time is more than the predetermined time;
updating the count value as zero, and controlling the monitor to exit the adjustment mode when the count value is equal to the number, or the function button is released when the calculated time is more than the predetermined time.

12. The method of claim 10, wherein the operation information comprises whether the function button is pressed or released, clicking of the primary button or the secondary button of the mouse, motions of a scroll wheel of the mouse, and motions of the mouse.

13. The method of claim 12, wherein the block (i) further comprises:
adjusting the display parameters according to the clicking of the primary button or the secondary button, the motions of the scroll wheel, and the motions of the mouse of the operation information.

14. The method of claim 10, wherein the block (j) further comprises:
controlling the monitor into the adjustment mode when the calculated time is more than the predetermined time.

15. A non-transitory storage medium storing a set of instructions, the set of instructions capable of being executed by a processor of a computing device, cause the computing device to execute a method for adjusting display parameters of a monitor of the computing device, the computing device electronically or wirelessly connecting to a mouse that comprises a function button and a microcontroller, the method comprising:
(a) arranging the display parameters of the monitor in a sequence, predefining a predetermined time, a number of the display parameters of the monitor, a count value and an adjustment mode of the monitor;
(b) assigning an initial value zero for the count value;
(c) continually acquiring operation information from the microcontroller, and detecting whether the function button is pressed according to the operation information;
(d) calculating a time of the function button when the function button is pressed, and determining whether the calculated time is more than the predetermined time;
(e) detecting whether the function button is released according to the operation information when the calculated time is not more than the predetermined time;
(f) determining whether the count value is equal to zero when the function button is released;
(g) determining whether the count value is equal to the number when the count value is not equal to zero;
(h) controlling the monitor into the adjustment mode when the count value is equal to zero;
(i) increasing the count value by one, and adjusting one of the display parameter corresponding to the count value in the sequence according to the operation information when the count value is not equal to the number; or
(j) adjusting the display parameters according to the operation information in the adjustment mode of the monitor when the calculated time is more than the predetermined time, increasing a contrast ratio of the monitor by clicking of a primary button of the mouse and decreasing the contrast ratio by clicking of a secondary button of the mouse, adjusting a display brightness of the monitor after the function button is pressed for the second time, adjusting a horizontal display position of the monitor via left-right motions of the mouse, and adjusting a vertical display position of the monitor via forward-backward motions of the mouse.

16. The medium of claim 15, further comprising:
detecting whether the function button is released according to the operation information when the calculated time is more than the predetermined time;
updating the count value as zero, and controlling the monitor to exit the adjustment mode when the count value is equal to the number, or the function button is released when the calculated time is more than the predetermined time.

17. The method of claim 16, wherein the operation information comprises whether the function button is pressed or released, clicking of the primary button or the secondary button of the mouse, motions of a scroll wheel of the mouse, and motions of the mouse.

18. The medium of claim 17, wherein the block (i) further comprises:
adjusting the display parameters according to the clicking of the primary button or the secondary button, the motions of the scroll wheel, and the motions of the mouse of the operation information.

19. The medium of claim 15, wherein the block (j) further comprises:
controlling the monitor into the adjustment mode when the calculated time is more than the predetermined time.

* * * * *